(12) United States Patent
Salesse-Lavergne

(10) Patent No.: US 9,789,953 B2
(45) Date of Patent: *Oct. 17, 2017

(54) FLIGHT CONTROL SYSTEM AND METHOD FOR A ROTARY WING AIRCRAFT, ENABLING IT TO MAINTAIN EITHER TRACK OR HEADING DEPENDING ON ITS FORWARD SPEED

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 11 days.

This patent is subject to a terminal disclaimer.

(21) Appl. No.: 14/750,731

(22) Filed: Jun. 25, 2015

(65) Prior Publication Data

US 2015/0375850 A1 Dec. 31, 2015

(30) Foreign Application Priority Data

Jun. 30, 2014 (FR) ...................................... 14 01474

(51) Int. Cl.
*G05D 1/00* (2006.01)
*B64C 13/18* (2006.01)
(Continued)

(52) U.S. Cl.
CPC .............. *B64C 13/18* (2013.01); *B64C 27/04* (2013.01); *B64C 27/57* (2013.01); *G05D 1/0858* (2013.01)

(58) Field of Classification Search
CPC ...... G05D 1/0858; G05D 1/102; B64C 27/04; B64C 13/18
(Continued)

(56) References Cited

U.S. PATENT DOCUMENTS 4,664,346 A * 5/1987 Koenig ................... B64C 13/46
244/17.13
5,001,646 A 3/1991 Caldwell et al.
(Continued)

FOREIGN PATENT DOCUMENTS

EP 0455580 11/1991
EP 0601122 3/1997
(Continued)

OTHER PUBLICATIONS

French Search Report for French Application No. FR 1401474 Completed by the French Patent Office dated Apr. 24, 2015, 11 Pages.
(Continued)

*Primary Examiner* — Gertrude Arthur Jeanglaude
(74) *Attorney, Agent, or Firm* — Brooks Kushman P.C.

(57) ABSTRACT

A flight control method and system for a rotary wing aircraft. When the longitudinal speed $U_X$ of the aircraft is greater than a first threshold speed $V_{thresh1}$, a first mode of operation of the method enables flight to be performed while maintaining track relative to the ground, the flight setpoints of an autopilot being a ground course angle $TK_{sol}$, a forward speed Va, a flight path angle P, and a heading $\Psi$. When the longitudinal speed $U_X$ is less than a second threshold speed $V_{thresh2}$, a second mode of operation enables flight to be performed while maintaining heading, the flight setpoints being the longitudinal speed $U_X$, a lateral speed $V_Y$, a vertical speed $W_Z$, and the heading $\Psi$.

18 Claims, 1 Drawing Sheet

(51) Int. Cl.
*G05D 1/08* (2006.01)
*B64C 27/04* (2006.01)
*B64C 27/57* (2006.01)

(58) Field of Classification Search
USPC .................. 701/3, 11, 14, 16; 244/17.13
See application file for complete search history.

(56) References Cited

U.S. PATENT DOCUMENTS

| | | | |
|---|---|---|---|
| 5,008,855 A * | 4/1991 | Eltoukhy et al. | G11C 17/18 257/E23.147 |
| 5,195,700 A * | 3/1993 | Fogler, Jr. | G05D 1/0858 244/17.13 |
| 5,213,283 A | 5/1993 | Gold et al. | |
| 6,070,829 A | 6/2000 | Bellera et al. | |
| 6,259,975 B1 | 7/2001 | Rollet et al. | |
| 6,622,065 B2 | 9/2003 | Mezan | |
| 7,427,046 B2 | 9/2008 | Bellera | |
| 8,392,037 B2 | 3/2013 | Sahasrabudhe et al. | |
| 8,788,123 B2 | 7/2014 | Salesse-Lavergne et al. | |
| 8,840,057 B2 | 9/2014 | Moret | |
| 8,977,412 B2 | 3/2015 | Certain | |
| 8,989,921 B2 | 3/2015 | Nannoni et al. | |
| 2011/0036954 A1 | 2/2011 | Piasecki | |
| 2012/0153074 A1 | 6/2012 | Nannoni et al. | |

FOREIGN PATENT DOCUMENTS

| | | |
|---|---|---|
| EP | 1607327 | 12/2005 |
| EP | 2574546 | 4/2013 |
| EP | 2597035 | 5/2013 |
| FR | 1347243 | 12/1963 |
| FR | 2756252 | 5/1998 |
| FR | 2777535 | 10/1999 |
| FR | 2814433 | 3/2002 |
| FR | 2991664 | 12/2013 |
| WO | 9305461 | 3/1993 |
| WO | 9534029 | 12/1995 |
| WO | 9955582 | 11/1999 |
| WO | 9964942 | 12/1999 |
| WO | 2012096668 | 7/2012 |
| WO | 2012134417 | 10/2012 |
| WO | 2012134460 | 10/2012 |
| WO | 2013012408 | 1/2013 |

OTHER PUBLICATIONS

French Search Report for French Application No. FR 1401470, Completed by the French Patent Office dated Apr. 14, 2015, 5 Pages.
French Search Report for French Application No. FR 1401479 Completed by the French Patent Office dated Apr. 24, 2015, 11 Pages.
Restriction Requirement for U.S. Appl. No. 14/750,726, Completed by the United States Patent and Trademark Office dated Nov. 28, 2016, 6 pages.
Notice of Allowance for U.S. Appl. No. 14/750,739, Completed by the United States Patent and Trademark Office dated Nov. 2, 2016, 14 pages.

* cited by examiner

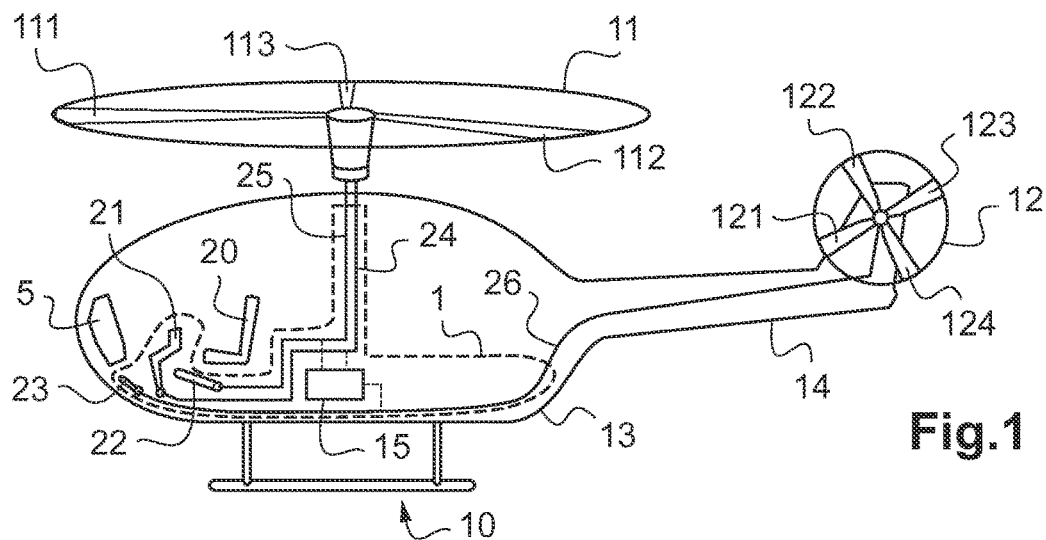
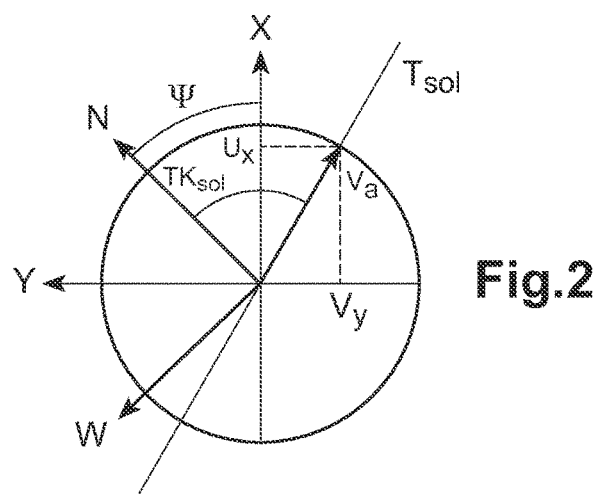
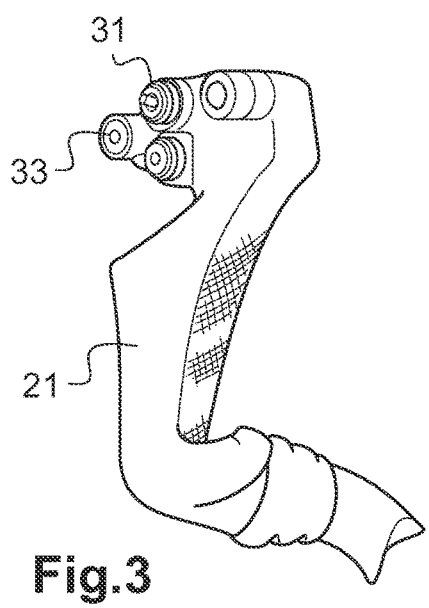
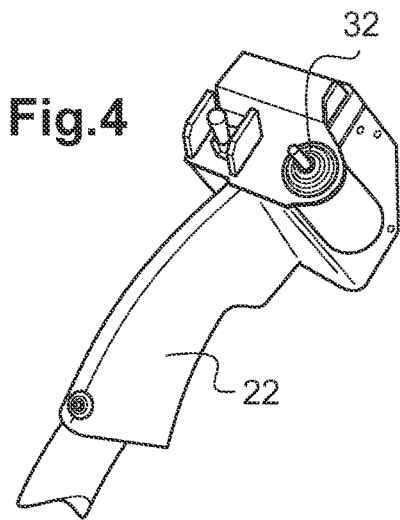

FLIGHT CONTROL SYSTEM AND METHOD FOR A ROTARY WING AIRCRAFT, ENABLING IT TO MAINTAIN EITHER TRACK OR HEADING DEPENDING ON ITS FORWARD SPEED

CROSS REFERENCE TO RELATED APPLICATION

This application claims priority to French patent application No. FR 14 01474 filed on Jun. 30, 2014, the disclosure of which is incorporated in its entirety by reference herein. This application is related to U.S. application Ser. No. 14/750,726 entitled "A Flight Control System And Method With Track Maintenance For A Rotary Wing Aircraft" filed on Jun. 25, 2015 and U.S. application Ser. No. 14/750,739 entitled "A Method And System For Engaging Hovering Flight For A Rotary Wing Aircraft, Enabling It To Maintain Either Track Or Heading Depending On Its Forward Speed" filed on Jun. 25, 2015.

BACKGROUND OF THE INVENTION (1) Field of the Invention

The present invention lies in the field of flight control systems for rotary wing aircraft, and more particularly the field of providing assistance in using flight controls, such as an autopilot.

The present invention relates to a flight control method for a rotary wing aircraft enabling it to maintain either track or heading depending on its longitudinal forward speed, and it thus forms a "full envelope" flight control method, i.e. a method that covers not only flight stages close to the ground and at low speed, but also flight stages at high altitudes and at high speed. The present invention also relates to a flight control system for a rotary wing aircraft enabling it to maintain either track or heading depending on its longitudinal forward speed.

(2) Description of Related Art

Rotary wing aircraft are aircraft that differ from other powered aircraft mainly by their ability to travel not only in cruising flight at high speeds, but also at low speeds or while hovering. This capacity is made available by using at least one main rotor of the aircraft, which rotor has an axis of rotation that is substantially vertical.

The main rotor constitutes a rotary wing providing the aircraft with lift and possibly also with propulsion. The behavior of the rotary wing aircraft in flight can be modified by varying the cyclic pitch and/or the collective pitch of the blades of the rotary wing. A variation in the cyclic pitch of the blades modifies the behavior of the aircraft in terms of attitude, and more particularly in pitching and/or in roll. A variation in the collective pitch of the blades leads to a modification in the behavior of the aircraft in terms of lift, making it possible in particular to generate movements along an axis that is substantially vertical, and also along its pitching and roll axes, depending on the attitude of the aircraft.

A rotary wing aircraft can also be maneuvered in yaw, even while stationary, by using a yaw anti-torque device. For example, such an anti-torque device is formed by a tail rotor having an axis of rotation that is substantially horizontal and located at the rear of the aircraft. Such a tail rotor has a plurality of blades, and as a general rule it is only the collective pitch of the blades that can be varied, even though it is also possible for the cyclic pitch to be variable.

A rotary wing aircraft generally has a single main rotor and a single anti-torque tail rotor. Nevertheless, a rotary wing aircraft may also have two contrarotating main rotors, e.g. in tandem or else on the same axis, in which case no anti-torque device is necessary.

Furthermore, a hybrid helicopter is a rotary wing aircraft having at least one main rotor that serves mainly to provide it with lift and to a smaller extent with propulsion, and at least one specific propulsion means such as a propulsive propeller. Such a hybrid helicopter enables large distances to be covered while traveling at a high forward speed. The anti-torque device of such a hybrid helicopter may be formed by at least one of its propulsive propellers. Such a propulsive propeller has a plurality of blades and as a general rule only their collective pitch is variable.

Furthermore, a rotary wing aircraft may have aerodynamic elements such as stabilizers, or even wings, particularly in hybrid helicopters. These aerodynamic elements may have moving parts and they can participate in making the aircraft maneuverable, in particular in cruising flight at high forward speeds.

The flight behavior of a rotary wing aircraft can be varied by modifying various flight parameters of the aircraft. These flight parameters include in particular cyclic and/or collective pitch values for the main rotors and the collective pitch value for the anti-torque rotor and/or the propulsion means, and the aerodynamic elements, if any. These flight parameters can be modified in this way in various control modes.

In a manual control mode the pilot of the rotary wing aircraft has control levers that the pilot of the aircraft moves manually in order to vary the flight parameters, and in particular the cyclic and/or collective pitch of the blades of the various rotors by means of manual control linkages. The concept of "manual" should be considered in opposition to the concept of "automatic", without prejudice to the means used by a person for maneuvering the aircraft, which means may in particular be pedals, a control stick, or a joystick.

In an embodiment of a manual control mode, control levers engage respective linkages for mechanically transmitting forces remotely, so as to enable the pilot of the rotary wing aircraft to act mechanically on the blades by using control levers, either directly, or else via servo-controls.

In another embodiment of a manual control mode, the pilot moving a control lever serves to generate electrical signals for activating at least one servo-control for moving the blades.

In an automatic control mode, an autopilot generates control signals for those flight parameters and in particular for varying the pitch of the blades of the various rotors by using automatic control linkages. When the autopilot is activated, the control signals take the place of the control signals generated by the pilot acting directly on the control levers for activating the servo-controls.

The autopilot enables the rotary wing aircraft to maintain stable progress in application of previously stored flight setpoints. The actual state of progress of the aircraft is evaluated by the autopilot at a given instant by means of information supplied by a variety of instrumentation on board the aircraft. On the autopilot detecting a difference between the flight setpoints and the actual state of progress of the aircraft, the autopilot acts on the flight behavior of the rotary wing aircraft by means of one or more flight parameters in order to re-establish its actual state of progression in compliance with the flight setpoints.

The pilot of the rotary wing aircraft activates the autopilot by using one or more specific control buttons.

In a stabilization mode performed by the autopilot, an initial setpoint for maintaining the attitude of the rotary wing aircraft may, for example, be defined relative to the state of progression of the aircraft as evaluated from activation of the autopilot. Stabilization mode serves to stabilize the aircraft by the autopilot correcting the attitude of the aircraft relative to the initial setpoint.

In a particular mode of piloting by transparency, the pilot may possibly intervene temporarily on the behavior of the aircraft by using control levers and overriding the control signals generated by the autopilot. The initial flight setpoints are unaffected, any temporary intervention by the pilot on the behavior of the aircraft not leading to any modification to the initial flight setpoints.

It is also known to correct a flight setpoint, such as a setpoint for maintaining attitude, as a function of the actual state of progression of the rotary wing aircraft after the pilot has acted on the control levers. It is also known to enable the pilot of the aircraft to correct an attitude maintaining setpoint by varying the value of that setpoint incrementally, the pilot making use of one or more dedicated control members. For example, two control members may be used of the kind commonly known as "beeps". For example, such control members may be positioned respectively on a collective pitch control lever and on a cyclic pitch control lever generally referred to as a "stick".

Document FR 1 347 243 describes a device for piloting by transparency that enables the pilot to take action either with a return to the initial flight setpoints after the pilot's action ceases or else with new flight setpoints being stored that take account of the action of the pilot.

Also known is Document FR 2 991 664, which describes an automatic system for providing piloting assistance that enables a flight parameter to be maintained on a progression axis of the aircraft while taking account of the action of the aircraft pilot on at least one other axis by using flight control levers while the autopilot of the aircraft is in operation. Various modes of guidance can be selected by the pilot, e.g. giving priority to maintaining a vertical speed or a forward speed or indeed maintaining heading, angle of attack, or flight path angle.

Furthermore, Document U.S. Pat. No. 5,001,646 describes an automatic control system enabling the pilot to act on the progression of the aircraft by means of a four-axis control member. The pilot can then control longitudinal, lateral, and vertical accelerations of the aircraft and also its angular speed in yaw, while conserving firstly, at low forward speed, a speed relative to the ground that is independent of the heading being followed, and secondly, at high forward speed, a coordinated turn and a flight path angle.

The rotary wing aircraft is stabilized using basic modes, in which, by way of example, the autopilot generates an increase in stability by damping angular movements of the aircraft, or indeed it serves to maintain attitude or heading. The basic modes provide piloting comfort for the pilot of the rotary wing aircraft, but they do not correct for potential differences relative to the speed or position the pilot desires for the aircraft. Proposals have thus been made to associate higher modes of operation with the basic modes in order to eliminate potential differences in position, speed, and/or acceleration of the aircraft compared with the values desired by the pilot. These desired values are input in the form of flight setpoints that the higher autopilot modes use for bringing the aircraft to the desired position, speed, and/or acceleration, and for maintaining it. The operation of stabilizing the aircraft obtained using the basic modes is performed quickly by the autopilot, whereas the operation of re-establishing position, speed, and/or acceleration of the rotary wing aircraft is performed subsequently and more slowly by the higher modes.

By way of example, Document WO 95/34029 describes a flight control system for an aircraft enabling the speeds of the aircraft to be stabilized by operating the controls relative to the yaw, roll, and pitching axes and also relative to lift, while maintaining a heading that is constant.

The autopilot can also provide advanced functions of assisting in the guidance of the rotary wing aircraft. The possibilities made available by the higher modes are also used to obtain such assistance. The ways in which advanced functions are executed depend on predefined capabilities of the autopilot relating to the setpoint track that is to be followed by the aircraft.

Specifically, such higher autopilot modes are designed to perform instrument flight rules (IFR) operations, i.e. for piloting that can be performed solely with the assistance of flight instruments and can thus be performed with degraded vision outside the aircraft, or indeed with no outside vision.

In contrast, visual flight rules (VFR) operations are performed when the pilot can control the aircraft by looking outside the aircraft and not only with the help of instruments and flight assistance.

By way of example, the setpoint track as used for a flight mission may be determined by the pilot of the rotary wing aircraft, or else during a stage of approaching a site that is known and identified. Such a site is provided in particular with means providing interactivity between the site and the autopilot, such as radio navigation beacons. In the absence of such interactive equipment, the site is identified by the pilot of the aircraft in manual mode, and then the pilot of the aircraft activates the desired advanced functions.

The operating capabilities of the autopilot make it possible to provide automatic piloting assistance by correcting the attitude of the rotary wing aircraft in cruising flight, at high forward speeds, and when the aircraft is in a position that is remote from the ground. In a stage of cruising flight, the surroundings of the aircraft are normally empty and the pilot of the aircraft does not need to pay sustained attention to the maneuvering of the aircraft. The pilot can also avoid such sustained attention close to the ground in surroundings that are known by making use of an advanced function of the autopilot, such as during a stage of approaching a landing ground that is known and/or provided with means for identifying its surroundings.

Likewise, during a stage of approaching an intervention site that is known to the autopilot and that has been recognized and identified, activation of an advanced function is made possible, even at low speeds, for guiding the rotary wing aircraft along the corresponding setpoint track.

In addition, like a person piloting an aircraft, the autopilot conventionally controls the longitudinal, lateral, and vertical speeds of the aircraft respectively by the longitudinal cyclic pitch, the lateral cyclic pitch, and the collective pitch of the main rotor, and the collective pitch of an anti-torque rotor controlling the orientation of the aircraft about its yaw axis. These longitudinal, lateral, and vertical speeds are defined in a reference frame tied to the aircraft having axes that are formed by the longitudinal, lateral, and vertical directions of the aircraft.

Furthermore, an autopilot can also enable the aircraft to perform coordinated turns. A coordinated turn is a turn performed without the aircraft drifting from the turn track relative to the ground, which is ground coordination, or else without any lateral load factor, which is air coordination.

With ground coordination, a turn is coordinated relative to the ground. The aircraft does not drift relative to the ground, thus enabling it to follow a ground track accurately. Such a turn that is coordinated relative to the ground is preferably used at low speed and low altitude so as to move safely in the proximity of terrain in relief or buildings, with the nose of the aircraft generally remaining in alignment with the ground track.

With air coordination, a turn is coordinated relative to the air. The aircraft does not drift relative to the air, thereby giving preference to the comfort of its occupants and minimizing the sideslip of the aircraft. Such a turn that is coordinated relative to the air is preferably used in cruising flight, i.e. at high speed and high altitude, and far away from any obstacles.

Document U.S. Pat. No. 5,213,283 describes a control system for performing a coordinated turn. That control system automatically supplies a yaw control signal in response to the pilot issuing a banking control signal while making such a coordinated turn, with the pilot's workload thus being reduced.

In addition, Document WO 2012/134447 describes a flight control system for an aircraft enabling a coordinated turn to be performed throughout the flight envelope, thereby minimizing the pilot's workload. At high speed, that control system makes use firstly of changes in the angle of attack of the aircraft to control heading and also lateral acceleration, and secondly of the air speed of the aircraft for controlling heading, so as to perform a coordinated turn relative to the air. At low speed, the control system makes use of the sideslip angle of the aircraft in order to maintain the heading in alignment with the track of the aircraft, thus performing a coordinated turn relative to the ground. In a transition zone between those two flight envelopes, the sideslip angle of the aircraft and its lateral acceleration are used to maintain the aircraft in a coordinated turn.

Furthermore, rotary wing aircraft are powered aircraft designed to be capable of flying in a variety of conditions that can sometimes be difficult, both in terms of atmospheric conditions, such as the presence of a strong wind and varying visibility conditions, and in terms of flight conditions, such as flying at low speeds or hovering, or indeed conditions involving the surroundings, such as being close to ground that is unknown or poorly known.

In difficult flight conditions, the pilot of the rotary wing aircraft is likely to need to take account of unexpected factors. It can then be awkward, or even impossible, for the pilot of the aircraft to make use of automatic assistance in maneuvering the aircraft under such difficult flying conditions. For example, when the aircraft is close to the ground, it must be possible for any change in its behavior to be implemented quickly. When the autopilot is using an advanced function implementing its higher modes of operation, it has difficulty in implementing a rapid modification to a track that is to be followed by the aircraft.

Under such difficult flying conditions, the use of IFR piloting can be dangerous and VFR piloting is to be preferred, but the pilot can nevertheless make use of assistance and/or certain instruments of the aircraft. Such conditions include in particular visual meteorological conditions (VMC) and degraded visual environment (DVE) conditions. The pilot may then find it necessary to make frequent adjustments to the speed and/or the track of the aircraft in order to avoid possible obstacles and in order to approach particular positions, e.g. if there is a strong side wind.

Document FR 2 777 535 describes a flight control system for an aircraft that makes it possible in particular to control lateral speed relative to the ground while maintaining a constant heading, e.g. for the purpose of compensating a strong side wind. That control system also makes it possible to maintain a constant direction for the speed of the aircraft, and thus for its track, while changing its heading and/or its longitudinal speed.

Furthermore, Document WO 2012/134460 describes a flight control system for an aircraft that makes it possible at a low speed to maintain a track that is constant relative to the ground while changing heading. The control system acts on the pitching and roll controls in order to maintain the track, with the pilot being able to cause the aircraft to move in rotation at any moment by means of those controls.

Likewise, Document WO 2012/096668 describes a flight control system for an aircraft that makes it possible to control the vertical speed of the aircraft, its flight path angle relative to the ground, and/or a height relative to the ground depending on its forward speed. Below a predetermined forward speed threshold, corresponding to a flight situation close to hovering, the flight control system makes it possible to maintain a height relative to the ground. Above that predetermined forward speed threshold, the flight control system then enables a vertical speed of the aircraft to be maintained or else it enables a flight path angle relative to the ground to be maintained.

Furthermore, Document FR 2 814 433 describes a flight control device for an aircraft in which an action on a control member can have different effects depending on the speed in translation of the aircraft. Thus, if this speed in translation of the aircraft is less than or equal to a predetermined threshold, an action on the control member acts directly on the speed in translation. In contrast, if the speed in translation of the aircraft is greater than the predetermined threshold, then an action on the control member acts, by way of example, on the acceleration in translation of the aircraft, or indeed on its angular speed.

Furthermore, Document WO 2013/012408 describes a flight control system for an aircraft that makes it possible automatically for the aircraft to engage hovering flight starting from forward flight, and also enables a position to be maintained in hovering flight.

Finally, the technological background of the field of the invention includes the following documents: WO 99/55582; EP 1 607 327; WO 93/05461; EP 2 574 546; EP 0 455 580; and WO 99/64942.

BRIEF SUMMARY OF THE INVENTION

An object of the present invention is thus to provide a flight control method and a flight control system that make it possible for a rotary wing aircraft to maintain track or to maintain heading depending on its longitudinal speed $U_X$, while avoiding the above-mentioned limitations.

According to the invention, a flight control method for enabling a rotary wing aircraft to maintain track or to maintain heading is for use in a rotary wing aircraft having at least one control member that is provided jointly with a plurality of movement axes A, B, C, D and an autopilot that generates control signals in predefined modes of operation and depending on flight setpoints.

The aircraft is characterized by three preferred directions, a longitudinal direction X extending from the rear of the aircraft towards the front of the aircraft, an elevation direction Z extending upwards perpendicularly to the longitudinal direction X, and a transverse direction Y extending from left to right perpendicularly to the longitudinal and elevation directions X and Z. The longitudinal direction X is the roll axis of the aircraft, the transverse direction Y is its pitching axis, and the elevation direction Z is its yaw axis.

The aircraft has at least one rotary wing provided with a plurality of main blades of pitch that is variable collectively and cyclically about respective pitch axes, enabling the aircraft to perform movements in rotation about those directions X, Y, Z and movements in translation along those directions X, Y, Z. The control signals from the autopilot can give rise to these movements of the aircraft in rotation and/or in translation relative to the directions X, Y, Z.

The flight control method is remarkable in that a first mode of operation of the control members and of the autopilot is applied when the longitudinal speed $U_X$ of the aircraft is greater than a first threshold speed $V_{thresh1}$, the autopilot then enabling the aircraft to fly while maintaining track relative to the ground, the flight setpoints of the autopilot being a ground course angle $TK_{sol}$, the forward speed Va, a flight path angle P, and a heading $\Psi$, and a second mode of operation of the control members and of the autopilot is applied when the longitudinal speed $U_X$ is less than a second threshold speed $V_{thresh2}$, the autopilot then enabling the aircraft to fly while maintaining heading, the flight setpoints of the autopilot being the longitudinal speed $U_X$, a lateral speed $V_Y$, a vertical speed $W_Z$, and a heading $\Psi$. Furthermore, the first threshold speed $V_{thresh1}$ is greater than the second threshold speed $V_{thresh2}$.

The longitudinal speed $U_X$ of the aircraft is a projection of the forward speed Va of the aircraft onto the longitudinal direction X.

The rotary wing aircraft has at least one rotary wing with an axis of rotation that is substantially vertical, i.e. parallel to the elevation direction Z, and it may be built with a variety of architectures. By way of example, the aircraft may have a single rotary wing formed by a main rotor providing the aircraft with lift and propulsion, together with an anti-torque tail rotor having an axis of rotation that is substantially horizontal, i.e. parallel to the transverse direction Y. The anti-torque tail rotor also serves to perform maneuvers about the yaw axis.

In another example, the aircraft has two rotary wings formed by two contrarotating main rotors that may either be in tandem or else on the same axis. The aircraft may also have at least one rotary wing, such as a main rotor, providing the aircraft mainly with its lift, and one or more propulsive propellers having axes of rotation that are substantially horizontal, i.e. parallel to the longitudinal direction X and serving to provide the aircraft with propulsion. Such an aircraft then constitutes a hybrid helicopter.

In addition, a rotary wing aircraft may include aerodynamic elements such as stabilizers or wings, in particular in hybrid helicopters. Such aerodynamic elements may include movable portions in order to facilitate maneuvering the aircraft, in particular in cruising flight.

Whatever the architecture of the aircraft, the pilot of the aircraft can modify the behavior in flight of the aircraft by acting on one or more control levers that serve to vary the cyclic pitch and/or the collective pitch of the main blades of each rotary wing, and also control means such as pedals for varying the collective pitch of the secondary blades of a tail rotor, or indeed a joystick for varying the collective pitch of the secondary blades of at least one propulsive propeller. Likewise, if aerodynamic elements are present on the aircraft, the pilot of the aircraft may also cause their moving portions to move in order to modify the behavior in flight of the aircraft.

Furthermore, the autopilot may also modify the behavior in flight of the aircraft by means of control signals that it supplies and in compliance with the flight setpoints, so as to cause variations in the cyclic pitch and/or the collective pitch of the main blades of each rotary wing, variation in the collective pitch of the secondary blades of a tail rotor or indeed of at least one propulsive propeller, and also movements of the moving portions of aerodynamic elements if there are any present.

These pitch variations and these movements of moving portions serve to generate movements in rotation and/or translation of the aircraft relative to the directions X, Y, Z or variations in the angular and/or linear speeds of the aircraft relative to the same directions X, Y, Z. These movements in rotation and in translation of the aircraft take place in a reference frame tied to the aircraft and formed by the directions X, Y, Z.

The aircraft also travels along a track $T_{sol}$ that is determined relative to the ground in order to reach a destination on the ground, such as a landing ground. It is considered that the aircraft travels along a track $T_{sol}$ when its center of gravity follows the track $T_{sol}$. The track $T_{sol}$ is defined in a terrestrial geographical reference frame, i.e. a reference frame that is stationary relative to the terrestrial globe and in which the aircraft can move. By way of example, this terrestrial geographical reference frame is formed from cardinal points, e.g. the directions north and east, and also a vertical direction such as the terrestrial gravity direction.

The flight of an aircraft along the track $T_{sol}$ can be characterized, in a first type of characterization, by a ground course angle $TK_{sol}$ measured relative to the direction of magnetic north or of geographical north, in a horizontal plane of the terrestrial geographical reference frame, a forward speed Va, a flight path angle P, and a heading $\Psi$. The forward speed Va of the aircraft is its speed along the direction of the track $T_{sol}$. The forward speed Va may be the forward speed of the aircraft relative to the ground or the forward speed of the aircraft relative to the air.

The forward speed of the aircraft relative to the ground is generally used as the forward speed Va when flying at low altitudes, i.e. when the aircraft is close to obstacles such as terrain in relief and buildings. In contrast, the forward speed of the aircraft relative to the air is used as the forward speed Va essentially during cruising flight at high altitudes, i.e. when the aircraft is remote from any obstacle.

The flight path angle P of the aircraft is the angle formed between the direction of the track $T_{sol}$ and a horizontal orientation of the terrestrial reference frame in which the track $T_{sol}$ is defined, i.e. relative to a plane perpendicular to the vertical direction formed by the terrestrial gravity direction.

The heading $\Psi$ of the aircraft is the angle formed between the north direction and the projection onto the horizontal plane of the terrestrial reference frame of the longitudinal direction X of the aircraft. Thus, when the heading $\Psi$ and the ground course angle $TK_{sol}$ are equal, the nose of the aircraft is pointing along the track $T_{sol}$. As a result, the longitudinal direction X is in alignment with the track $T_{sol}$. Otherwise, the nose of the aircraft does not lie on the track $T_{sol}$ and the track $T_{sol}$ is then not in alignment with the longitudinal direction X, it being understood that a rotary wing aircraft possesses the ability to advance in any direction independently of its own longitudinal direction X.

The flight of an aircraft along the track $T_{sol}$ can also be characterized, in a second type of characterization, by a speed along the three preferred directions X, Y, Z of the aircraft, i.e. a longitudinal speed $U_X$ in the longitudinal direction X, a lateral speed $V_Y$ in the transverse direction Y, and a vertical speed $W_Z$ in the elevation direction Z, and also by the heading $\Psi$. These longitudinal, lateral, and vertical speeds $U_X$, $V_Y$, and $W_Z$ are the components of the forward speed of the aircraft along those three preferred directions X, Y, Z of the aircraft, and preferably of the forward speed of the aircraft relative to the ground.

This second type of characterization of the track $T_{sol}$ is linked directly with the capabilities of an aircraft to move in rotation about the directions X, Y, Z and in translation along the directions X, Y, Z. A rotary wing aircraft generally has at least a first control lever, also known as a "stick", for modifying the cyclic pitch of a main rotor, and a second control lever that enables the collective pitch of the main rotor to be modified. The first control lever has two movement axes thus making it possible to control simultaneously movements in rotation of the aircraft about the longitudinal and transverse directions X and Y, and consequently to act on the longitudinal and lateral speeds $U_X$ and $V_Y$ of the aircraft. The second control lever has a single movement axis and serves to control movements in translation of the aircraft along the elevation direction Z, and consequently to act on the vertical speed $W_Z$ of the aircraft.

Furthermore, such a rotary wing aircraft generally has pedals enabling an anti-torque device to be controlled, e.g. by modifying the collective pitch of an anti-torque tail rotor, thus serving to control the yaw angle of the aircraft, and consequently its heading $\Psi$.

When such an aircraft has aerodynamic elements with moving portions, it may also have control means enabling movements of those moving portions to be controlled and consequently enabling the attitudes of the aircraft to be modified in order to act on the longitudinal, lateral, and vertical speeds $U_X$, $V_Y$, and $W_Z$ of the aircraft. Movements of these moving portions may also be coupled to the first and second levers.

This second type of characterization of the track $T_{sol}$ is particularly suitable for the aircraft flying at a very low forward speed while guaranteeing that the heading $\Psi$ of the aircraft is maintained so as to travel with constant exposure to the wind and so as to minimize any changes to the visual references seen by the aircraft pilot. This second type of characterization of the track $T_{sol}$ may be used in particular in special circumstances such as maintaining a hovering position, or moving around a hovering position, or indeed winching from a moving boat. Directly controlling the longitudinal, lateral, and vertical speeds $U_X$, $V_Y$, and $W_Z$ of the aircraft without changing the heading $\Psi$ of the aircraft makes it possible to fly close to a winching target or a landing target, and to adjust easily the position of the aircraft relative to such a target, e.g. by moving laterally or vertically. Independently modifying the heading $\Psi$ makes it possible to select a heading that gives the aircraft a desired exposure to the wind or desired visibility of the target, and then to maintain the heading $\Psi$ while performing subsequent speed adjustments.

The first type of characterization of the track $T_{sol}$ is more adapted to cruising flight at high altitude by guaranteeing that the track $T_{sol}$ is maintained in order to modify directly the course angle $TK_{sol}$ independently of the forward speed Va and the flight path angle P, or else to modify only the forward speed Va, or indeed only the flight path angle P. Under such circumstances, in response to the pilot of the aircraft controlling movement around the roll axis, the nose of the aircraft turns so as to attempt to remain in alignment with the track $T_{sol}$ being followed by the aircraft, thus making it easier to follow the track $T_{sol}$ while limiting or even eliminating the discomfort created by the aircraft banking in roll. Nevertheless, this first type of characterization of the track $T_{sol}$ can also be used during a low altitude flight in order to approach a target such as a landing ground along the track $T_{sol}$.

In contrast, the first type of characterization of the track $T_{sol}$ is not tied directly and simply to the movement capacities of the aircraft. When the pilot seeks to modify one or more parameters of this first type of characterization of the track $T_{sol}$, the pilot cannot act directly on the ground course angle $TK_{sol}$, the forward speed Va, the flight path angle P, or the heading $\Psi$. In general, the pilot needs to act simultaneously on a plurality of flight parameters including the collective and cyclic pitches of the main blades of at least one main rotor and possibly also the collective pitch of a tail rotor or of at least one propulsive propeller, or indeed the movement of at least one moving portion of an aerodynamic element. In addition, it is practically impossible for the pilot acting manually on the flight parameters to modify only one of these parameters of the track $T_{sol}$ without at least one other parameter of the track $T_{sol}$ also being modified. Furthermore, depending on the architecture of the rotary wing aircraft, it is possible to modify at least one of these parameters of the track $T_{sol}$ by acting equally well on several flight parameters of the aircraft.

For example, it is possible to modify the forward speed Va of a hybrid helicopter by acting either on the propulsive propellers or on the main rotor. In contrast, if the heading $\Psi$ of the aircraft is different from its ground course angle $TK_{sol}$, then acting solely on the propulsive propellers or on the main rotor will modify the forward speed Va, and also the ground course angle $TK_{sol}$.

Thus, the flight of an aircraft along a track $T_{sol}$ can be characterized by these two types of characterization, either by a ground course angle $TK_{sol}$, a forward speed Va, a flight path angle P, and a heading $\Psi$, or else by a longitudinal speed $U_X$, a lateral speed $V_Y$, a vertical speed $W_Z$, and a heading $\Psi$.

The flight control method of the invention makes it possible to switch between a first mode of operation of the control members and of the autopilot using a first type of characterization of the track $T_{sol}$, and a second mode of operation of the control members and of the autopilot using the second type of characterization of the track $T_{sol}$, with switching between modes being a function of the longitudinal speed $U_X$ of the aircraft. This second mode of operation of the control members and of the autopilot is thus used at low forward speeds Va, while the first mode of operation is used at higher forward speeds Va.

Thus, when the longitudinal speed $U_X$ is greater than the first threshold speed $V_{thresh1}$, the autopilot enables the aircraft to fly while maintaining track relative to the ground, with the flight setpoints of the autopilot then being the ground course angle $TK_{sol}$, the forward speed Va, the flight path angle P, and the heading $\Psi$. In contrast, when the longitudinal speed $U_X$ is less than the second threshold speed $V_{thresh2}$, the autopilot enables the aircraft to fly while maintaining heading, with the flight setpoints of the autopilot then being the longitudinal speed $U_X$, the lateral speed $V_Y$, the vertical speed $W_Z$, and the heading $\Psi$.

Nevertheless, causing the aircraft to travel along a flight path angle P has meaning only above a certain forward speed, specifically of about 20 knots (kt). When the forward speed Va of the aircraft is less than a third threshold speed $V_{thresh3}$, typically equal to 20 kt, but while still in the speed range for maintaining track, the piloting of the aircraft may be performed with the flight setpoint that corresponds to the flight path angle P being replaced by a flight setpoint that corresponds to the vertical speed $W_Z$.

In addition, switching between the first and second modes of operation of the control members and of the autopilot is performed relative to a threshold with hysteresis by using threshold speeds $V_{thresh1}$ and $V_{thresh2}$ with the first threshold speed $V_{thresh1}$ being greater than the second threshold speed $V_{thresh2}$.

The term "threshold with hysteresis" is used to mean a set of thresholds in which the setpoint for activating a system is different from its setpoint for stopping it. Such a threshold with hysteresis has a high threshold and a low threshold that are different. The presence of these two thresholds serves essentially to avoid an excessive number of consecutive activations or stops. In the method of the invention, the high threshold is the first threshold speed $V_{thresh1}$ and the low threshold is the second threshold speed $V_{thresh2}$.

Thus, the first mode of operation of the control members and of the autopilot is engaged as soon as the longitudinal speed $U_X$ exceeds the first threshold speed $V_{thresh1}$ and it remains engaged so long as the longitudinal speed $U_X$ is greater than or equal to the second threshold speed $V_{thresh2}$. Likewise, the second mode of operation of the control members and of the autopilot is engaged as soon as the longitudinal speed $U_X$ becomes less than the second threshold speed $V_{thresh2}$, and it remains engaged so long as the longitudinal speed $U_X$ is less than or equal to the first threshold speed $V_{thresh1}$.

In addition, the threshold speeds $V_{thresh1}$ and $V_{thresh2}$ may be functions of the flying conditions of the aircraft, essentially the longitudinal speed of the relative wind to which the aircraft is subjected and the lateral speed $V_Y$ of the aircraft. Depending on the longitudinal speed of the relative wind to which the aircraft is subjected, the nose of the aircraft may be in alignment with the track $T_{sol}$ of the aircraft or it may be turned towards the direction of the wind. For example, at low longitudinal speed $U_X$, a pilot preferably maintains the nose of the aircraft in alignment with the wind direction if the wind is strong so as to avoid having a cross-wind. In contrast, at the same low longitudinal speed $U_X$, the pilot will align the nose of the aircraft on the track $T_{sol}$ of the aircraft when the wind is light and will keep the nose in the direction of the wind when the wind is strong. Making these thresholds depend on the projection of the wind on the longitudinal axis of the aircraft thus makes it possible to approximate the actions that a pilot would perform naturally.

The longitudinal speed of the relative wind to which the aircraft is subjected is used to mean the projection onto the longitudinal direction X of the speed of this relative wind to which the aircraft is subjected. By convention, it is considered that a longitudinal speed of the relative wind to which the aircraft is subjected is positive when the aircraft is facing the wind and that such a longitudinal speed of the wind is negative when the aircraft has its tail to the wind.

For example, with a head wind at a speed of less than 20 kt, the first threshold speed $V_{thresh1}$ is equal to 5 kt and the second threshold speed $V_{thresh2}$ is equal to 7 kt. For a head wind having speed lying in the range 20 kt to 40 kt, the first threshold speed $V_{thresh1}$ is equal to 8 kt and the second threshold speed $V_{thresh2}$ is equal to 10 kt.

Furthermore, if the lateral speed $V_Y$ of the aircraft is less than or equal to 20 kt, no multiplying coefficient is applied to the threshold speeds $V_{thresh1}$ and $V_{thresh2}$. In contrast, if the lateral speed $V_Y$ of the aircraft is greater than 20 kt, a multiplying coefficient may be applied to the threshold speeds $V_{thresh1}$ and $V_{thresh2}$. This multiplying coefficient may for example be equal to 1.5 when the lateral speed $V_Y$ is 40 kt.

The flight control method of the invention is engaged by the pilot acting on activation means, e.g. by pressing once or twice on a dedicated button.

Furthermore, the pilot may have frequent need to adjust the track $T_{sol}$ manually both during cruising flight and during low altitude flight in order to approach destinations as a function of the surroundings and/or of weather conditions. In particular in visual flight at low altitude, the pilot may adjust this track $T_{sol}$ in order to fly close to buildings or terrain in relief, e.g. while being subjected to a strong wind, such as a side wind, that may have an influence on the maneuvers to be performed by the aircraft.

Advantageously, the flight control method of the invention enables the pilot to act directly and independently on the parameters characterizing the track $T_{sol}$ by transparency by using control members for the purpose of modifying these parameters characterizing the track $T_{sol}$.

As a result, in the first mode of operation of the control members and of the autopilot, it is possible by transparency to control the parameters of the track $T_{sol}$, as specified in the first type of characterization for the track $T_{sol}$, so as to cause the aircraft to follow a new track $T_{soln}$.

It is thus possible by transparency to modify the forward speed Va independently of the ground course angle $TK_{sol}$ and of the flight path angle P or else the vertical speed $W_Z$, where appropriate, by taking a first action relative to a first movement axis A of a control member and by means of the autopilot. Likewise, it is possible by transparency to modify the ground course angle $TK_{sol}$ independently of the forward speed Va and of the flight path angle P or else of the vertical speed $W_Z$, where appropriate, by taking a second action relative to a second movement axis B of a control member and by means of said autopilot, and also to modify the flight path angle P or else the vertical speed $W_Z$, where appropriate, independently of the forward speed Va and of the ground course angle $TK_{sol}$ by taking a third action relative to a third movement axis C of a control member and by means of said autopilot.

Thus, taking action on a control member relative to at least three movement axes A, B, C, D makes it possible by means of the autopilot acting on the various flight parameters to modify respectively and independently the forward speed Va, the ground course angle $TK_{sol}$, and the flight path angle P or else the vertical speed $W_Z$, where appropriate, of the track $T_{sol}$. Taking such an action relative to one of these movement axes A, B, C, then modifies the flight setpoints supplied to the autopilot which generates control signals in order to perform the pilot's request. For this purpose, the autopilot may act on one or more flight parameters of the aircraft, such as the collective and cyclic pitches of the main blades of a main rotor, the collective pitch of the secondary blades of a tail rotor, or indeed of at least one propulsive propeller, or even movements of moving portions of aerodynamic elements present on the aircraft, if any, in order to modify a single parameter of the track $T_{sol}$ in the first type of characterization.

Following each action taken by the pilot on at least one control member relative to the movement axes A, B, C, D, the aircraft travels along a new track $T_{soln}$ that is characterized in the first type of characterization by a new ground course angle $TK_{soln}$, a new forward speed $Va_n$, a new flight path angle $P_n$ or else a new vertical speed $W_{Zn}$, where appropriate, and/or a new heading $\Psi_n$.

During this first mode of operation of the control members and of the autopilot and on each occasion the pilot acts on a control member, the flight setpoints of the autopilot are aligned on the parameters of the new track $T_{soln}$. Aligning the flight setpoints on the parameters of the new track $T_{soln}$ means that the initial flight setpoints are modified to take on values that correspond to the new track $T_{soln}$, these flight setpoints then being the new ground course angle $TK_{soln}$, the new forward speed $Va_n$, the new flight path angle $P_n$ or the new vertical speed $W_{Zn}$, where appropriate, and/or the new heading $\Psi_n$ so that the aircraft under the control of the autopilot follows this new track $T_{soln}$. Thus, the flight control method of the invention enables the pilot to modify the track $T_{sol}$ followed by the aircraft by acting directly on the parameters of the track $T_{sol}$ while maintaining track in the first type of characterization and enables the autopilot automatically to follow the new track $T_{soln}$ selected by the pilot.

Furthermore, the pilot acting relative to a fourth movement axis D of a control member also enables a parameter of the track $T_{sol}$ of the aircraft to be modified. For example, the heading $\Psi$ may be modified by taking an action relative to this fourth movement axis D.

Furthermore, the heading $\Psi$ may be modified directly by the pilot of the aircraft acting on the pedals conventionally present in an aircraft. In addition, this heading $\Psi$ has no effect on the track $T_{sol}$ followed by the aircraft and, consequently, on the forward direction of the aircraft in the context of this first mode of operation with track being maintained, the direction of the track $T_{sol}$ being defined by the ground course angle $TK_{sol}$.

Consequently, the pilot acting relative to a fourth movement axis D of a control member can enable some other parameter of the track $T_{sol}$ of the aircraft to be modified. Preferably, an action of the pilot relative to this fourth movement axis D makes it possible to modify the ground course angle $TK_{sol}$, the pilot thus having two options for modifying this ground course angle $TK_{sol}$ by means of two movement axes B and D.

Consequently, the flight setpoints of the autopilot are aligned on the first parameter of the track $T_{sol}$ that has been modified by this action of the pilot on a control member relative to the fourth movement axis D so that the aircraft follows the new track $T_{soln}$ by means of the autopilot.

Advantageously, using these two movement axes B and D to act on the ground course angle $TK_{sol}$ only enables the pilot to have greater flexibility in modifying this ground course angle $TK_{sol}$, e.g. using either hand, thereby making it easier to string together maneuvers and/or modifications to the parameters of the track $T_{sol}$ of the aircraft.

Nevertheless, the heading $\Psi$ may be modified without the pilot acting directly on the heading $\Psi$ in the event of the pilot acting on a control member in order to modify the ground course angle $TK_{sol}$ or the forward speed Va.

For example, during particular flying conditions, essentially in strong wind, certain limiting angles between the longitudinal direction X and the track $T_{sol}$ can lead to flight that is uncomfortable for the occupants or even dangerous. In particular, aligning the longitudinal direction X of the aircraft with its track $T_{sol}$ in the presence of a strong side wind can lead to such particular conditions.

In these particular flight conditions, the heading $\Psi$ can be modified by the autopilot during variations in the ground course angle $TK_{sol}$ or in the forward speed Va so as to avoid reaching such limiting angles.

Consequently, the flight setpoints of the autopilot are aligned on the parameter of the track $T_{sol}$ that has been modified by the action of the pilot, i.e. the new ground course angle $TK_{soln}$ or the new forward speed $Va_n$ and the new heading $\Psi_n$ so that the aircraft follows the newly obtained track $T_{soln}$ by means of the autopilot.

Likewise, a modification to the heading $\Psi$ under the control of the pilot, e.g. by transparency by means of pedals of the aircraft, can lead to the autopilot modifying the ground course angle $TK_{sol}$ in order to avoid reaching such limiting angles.

Once more, the flight setpoints of the autopilot are aligned on the new heading $\Psi_n$ of the new track $T_{soln}$ and possibly the new ground course angle $TK_{soln}$ so that the aircraft follows the resulting new track $T_{soln}$ by means of the autopilot.

Naturally, in this second mode of operation, the pilot may also act simultaneously on a plurality of movement axes A, B, C, D, with the autopilot generating control signals in order to modify the parameters of the track $T_{sol}$ requested by the pilot without modifying other parameters of the track $T_{sol}$.

Furthermore, during the second mode of operation of the control members and of the autopilot, it is possible independently and by transparency to vary the parameters of the track $T_{sol}$, as specified in the second type of characterization for the track $T_{sol}$, so that said aircraft follows a new track $T_{soln}$.

It is thus possible, by transparency, to modify the longitudinal speed $U_X$ by taking a first action relative to a first movement axis A of a control member and by means of the autopilot. Likewise, it is possible by transparency to modify the lateral speed $V_Y$ by taking a second action relative to a second movement axis B of the control member and by means of said autopilot, and also to modify the vertical speed $W_Z$ by taking a third action relative to a third movement axis C of a control member and by means of said autopilot.

Furthermore, the pilot taking an action relative to a fourth movement axis D of a control member makes it possible to modify the heading $\Psi$ of the aircraft, thereby having a direct effect on the forward direction of the aircraft when maintaining heading, as contrasted to maintaining track. The directions X, Y, Z, and consequently the longitudinal, lateral, and vertical speeds $U_X$, $V_Y$, and $W_Z$ are tied to the aircraft. Each modification to the heading $\Psi$ thus causes these directions X, Y, Z to be modified relative to a terrestrial reference frame, and consequently the directions of the longitudinal, lateral, and vertical speeds $U_X$, $V_Y$, and $W_Z$ also change.

Thus, an action on a control member relative to the movement axes A, B, C, D makes it possible by means of the autopilot acting on the various flight parameters to modify respectively and independently the longitudinal, lateral, and vertical speeds $U_X$, $V_Y$, and $W_Z$, and also the heading $\Psi$. Such an action relative to one of the movement axes A, B, C, D thus modifies the flight setpoints supplied to the autopilot, which generates control signals in order to implement the pilot's request.

After each action of the pilot on at least one control member relative to the movement axes A, B, C, D, the aircraft travels along a new track $T_{soln}$ that is characterized in the second type of characterization by new longitudinal, lateral, and vertical speeds $U_{Xn}$, $V_{Yn}$, and $W_{Zn}$, and/or by a new heading $\Psi_n$.

During this second mode of operation of the control members and of the autopilot, and on each occasion the pilot acts on a control member, the flight setpoints of the autopilot can be aligned on the parameters of the new track $T_{soln}$, i.e. the new longitudinal, lateral, and vertical speeds $U_{Xn}$, $V_{Yn}$, and $W_{Zn}$, and/or the new heading $\Psi_n$, so that the aircraft follows this new track $T_{soln}$ by means of the autopilot.

Nevertheless, systematically synchronizing the flight setpoints of the autopilot on the new longitudinal, lateral, and vertical speeds $U_{Xn}$, $V_{Yn}$, and $W_{Zn}$, as a result of an action of the pilot on at least one control member relative to the movement axes A, B, C, D can lead to a dangerous flight situation, depending on the surroundings in which the aircraft is to be found, in particular when the aircraft is traveling close to buildings or to terrain in relief. Different synchronization conditions may be taken into account for performing this synchronization of the flight setpoints of the autopilot.

In first synchronization conditions, these flight setpoints are aligned respectively and independently on the new longitudinal and lateral speeds $U_{Xn}$ and $V_{Yn}$ if this new longitudinal speed $U_{Xn}$ is greater than a fourth threshold speed $V_{thresh4}$ and if this new lateral speed $V_{Yn}$ has an absolute value that is less than a fifth threshold speed $V_{thresh5}$. Under such circumstances, the fourth threshold speed $V_{thresh4}$ may for example be equal to 0 kt, thus avoiding one of the flight setpoints being a negative longitudinal speed $U_X$, which would lead to the aircraft flying backwards, i.e. with greatly reduced visibility. This fourth threshold speed $V_{thresh4}$ may also be equal to −10 kt, thus avoiding one of the flight setpoints being a negative speed $U_X$ that is too great, leading to the aircraft moving backwards quickly. Likewise, the new lateral speed $V_{Yn}$ becomes one of the flight setpoints providing it does not generate lateral movement of the aircraft that is too fast. The fifth threshold speed $V_{thresh5}$ may for example be 45 kt.

In second synchronization conditions, these flight setpoints are aligned respectively and independently on the new longitudinal speed $U_{Xn}$ if the new longitudinal speed $U_{Xn}$ is greater than a fourth threshold speed $V_{thresh4}$ and on the new lateral speed $V_{Yn}$ after a specific action by a pilot of the aircraft. By way of example, this pilot action may be pressing on a button for synchronizing the new lateral speed $V_{Yn}$ of the aircraft. In these second synchronization conditions, the pilot decides whether the new lateral speed $V_{Yn}$ is to be one of the flight setpoints.

In contrast, regardless of the synchronization conditions, if the new longitudinal speed $U_{Xn}$ is less than a fourth threshold speed $V_{thresh4}$, the flight setpoint corresponding to the longitudinal speed $U_X$ is aligned on this fourth threshold speed $V_{thresh4}$.

Likewise, if the new lateral speed $V_{Yn}$ has an absolute value greater than the fifth threshold speed $V_{thresh5}$, the flight setpoint corresponding to the lateral speed $V_Y$ is aligned on this fifth threshold speed $V_{thresh5}$.

The flight setpoint corresponding to the vertical speed $W_Z$ of the aircraft is generally zero for flight while maintaining heading. Such flight generally takes place at low altitude with the aircraft traveling in such surroundings in automatic flight at an altitude that is constant relative to the ground, i.e. with a vertical speed $W_Z$ of zero. After an action of the pilot generating a modification to this vertical speed $W_Z$, the flight setpoint corresponding to the vertical speed $W_Z$ generally remains unchanged, and thus zero.

Nevertheless, if this action of the pilot causes the aircraft to travel with a new vertical speed $W_{Zn}$ that is large and greater than a sixth threshold speed $V_{thresh6}$, and if the pilot does not reduce this new vertical speed $V_{Zn}$, it can be deduced that the pilot is now seeking to travel with this new vertical speed $V_{Zn}$. Under such circumstances, the flight setpoint may be aligned on the new vertical speed $V_{Zn}$ so long as it is greater than a sixth threshold speed $V_{thresh6}$. For example, the sixth threshold speed $V_{thresh6}$ is equal to 500 feet per minute (ft/min).

In contrast, when the new vertical speed $W_{Zn}$ of the aircraft is negative, the flight setpoint corresponding to this vertical speed $W_Z$ may remain zero, in particular in order to avoid any risk of the main rotor of the aircraft losing lift by passing through a mass of air that has previously been stirred by the main rotor. Nevertheless, since this risk of losing lift appears at a downward vertical speed $W_Z$ faster than −500 ft/min, the flight setpoint corresponding to the vertical speed $W_Z$ of the aircraft may be aligned on the new vertical speed $W_{Zn}$ when this new vertical speed $W_{Zn}$ lies in a range of downward vertical speeds $W_Z$ that are not faster than −500 ft/min. For example, this range of vertical speeds $W_Z$ may have a lower limit of −500 ft/min and an upper limit of −300 ft/min.

Furthermore, acting manually to keep an aircraft at a speed of zero, whether that be the longitudinal speed $U_X$, the lateral speed $V_Y$, and/or the vertical speed $W_Z$ imposes a workload on the pilot that becomes even greater when conditions outside are unfavorable, such as poor visibility or the presence of turbulence, for example. Such outside conditions can go so far as to make the task impossible, for example in the event of a complete loss of visibility associated with the presence of a cloud of sand or dust or indeed snow raised by the wash from the main rotor.

If the new longitudinal speed $U_{Xn}$ and/or the new lateral speed $V_{Yn}$ has an absolute value that is small and less than a seventh threshold speed $V_{thresh7}$, it can be considered that the pilot seeks to maintain this new speed at zero and that the corresponding flight setpoint should be zero. This seventh threshold speed $V_{thresh7}$ may for example be equal to 1 kt.

By way of example, when the longitudinal and lateral speeds $U_X$ and $V_Y$ are less than this seventh threshold speed $V_{thresh7}$, the aircraft is in a flying situation close to hovering, and the flight control system then makes it possible to maintain a stationary position relative to the ground.

In contrast, the flight setpoints of the autopilot continue to be aligned on the new heading $\Psi_n$.

Thus, the flight control method of the invention enables the pilot to modify the track $T_{sol}$ followed by the aircraft by acting directly on the parameters of the track $T_{sol}$, while maintaining heading in the second type of characterization, and enables the autopilot to follow automatically the new track $T_{soln}$ selected by the pilot.

Naturally, the pilot in this second mode of operation may also act simultaneously on a plurality of movement axes A, B, C, D, the autopilot generating control signals in order to make the modifications to the parameters of the track $T_{sol}$ as requested by the pilot, but without modifying the other parameters of that track $T_{sol}$.

Advantageously, the flight control method of the invention thus makes it possible to provide automatic flight maintaining track or heading, depending on the longitudinal speed $U_X$ of the aircraft, while also allowing piloting to be performed by transparency.

Whatever the mode of operation of the control members and the autopilot, the first and second control levers can be used as being respectively the first and second control members, the first control member then having the first movement axis A and the second movement axis B, and the second control member having the third movement axis C. These first and second levers thus enable the aircraft to be piloted while maintaining track or heading as the case may be while using the method of the invention and by means of the autopilot.

Nevertheless, such particular utilization of control levers is not appropriate for performing a sudden maneuver of the aircraft, e.g. for the purpose of avoiding an obstacle that lies on the track $T_{sol}$ of the aircraft or close to it. The first and second control levers in this particular utilization do not enable the aircraft to make a vertical or lateral movement rapidly.

A sudden obstacle-avoiding maneuver is generally performed solely by moving in rotation about the pitching axis, i.e. by using the first control lever so as to perform a vertical movement. However such a maneuver about the pitching axis, as obtained by longitudinal variation of the cyclic pitch, can be accompanied by the pilot acting on the second control lever thus leading also to a variation in the collective pitch.

A violent action of the pilot on at least one of the first and second control levers, and preferably on the first control lever only, leads to the autopilot acting to maintain track then deactivating its maintenance of the flight path angle P setpoint or of the vertical speed $W_Z$ setpoint, where appropriate. As a result, the pilot can control the longitudinal cyclic pitch so as to act on the aircraft and make it move in rotation about the pitching axis and possibly also so as to act on the collective pitch so as to make the aircraft move in translation along the elevation direction Z and thus perform the needed avoidance maneuver.

Nevertheless, during flight stages close to hovering flight, it is not necessary to identify a violent action of the pilot on any of the control levers. The actions that are allocated to the first and second control levers are allocated in non-ambiguous manner, a longitudinal action on the first control lever having an effect essentially on the longitudinal speed of the aircraft and an action on the second control lever having an effect essentially on its vertical speed. The pilot can then perform the avoidance maneuver, if necessary.

For example, after such a sudden action of the pilot has been detected and after switching over to a mode of operation for piloting by transparency, the pilot can, by transparency, control the pitching of the aircraft by using the first control lever so as to cause the aircraft to move in rotation about the transverse direction Y. The flight path angle P is then no longer considered to be a flight setpoint for maintaining track and thus is not controlled by the autopilot in order to avoid countering the avoidance maneuver. Furthermore, the collective pitch remains constant except for pilot action by transparency on the second control lever in order to cause the aircraft to move in translation along the elevation direction Z.

The term "violent" action is used to mean an action of large amplitude of the pilot of the aircraft on either one of the two control levers. Such a large amplitude action can be considered as the pilot making a request to avoid an obstacle, given that piloting for maintaining track or for maintaining heading is performed by small amplitude movements in order to obtain modification to the track $T_{sol}$.

Furthermore, the flight control system of the invention may include control members that are dedicated to piloting the aircraft by transparency while it is maintaining track or maintaining heading along the track $T_{sol}$ by means of the method of the invention and the autopilot.

The flight control system of the invention may for example include a first control member positioned on the first control lever and a second control member positioned on the second control lever. The first control member has the first movement axis A and the second movement axis B, while the second control member has the third movement axis C and possibly the fourth movement axis D.

The flight control system thus has two control members operating jointly relative to at least three movement axes A, B, C and possibly four movement axes A, B, C, D. A first control member is provided with two movement axes A, B and a second control member is provided with one or two movement axes C, D.

Such control members are generally calibrated and thus control precise and predetermined movements of the aircraft. Thus, regardless of the mode of operation of the control members and of the autopilot, when the pilot acts on one of the control members by exerting a tap or a long press relative to a movement axis A, B, C, D, then one of the parameters of the track $T_{sol}$ is varied by a predetermined value. Such control members are often referred to as "beeps".

By way of example, a press on a control member may be considered as being long when the press is held for a duration of at least 1 second (s). A tap on this control member then corresponds to pressing for a shorter duration.

For example, when the aircraft is flying while maintaining track, in the event of a long press on a control member relative to the movement axis A, the aircraft accelerates or decelerates by 1.5 knots per second (kt/s) on the track $T_{sol}$ so long as this press is maintained. Thereafter, when the pilot releases the control member relative to the movement axis A, the autopilot aligns its flight setpoints on the new forward speed $Va_n$ of the aircraft, stabilizing this new forward speed $Va_n$ of the aircraft by canceling the acceleration or the deceleration that was present at the moment when the pilot released the long press on the control member.

Likewise, during a long press on a control member relative to the movement axis B or the movement axis D, the ground course angle $TK_{sol}$ of the aircraft is varied at a rate that is typically 3 degrees per second (°/s) so long as this long press is maintained. Thereafter, when the pilot releases this control member relative to the movement axis B or D, the autopilot aligns its flight setpoint on the new ground course angle $TK_{soln}$ of the aircraft in order to follow a new track $T_{soln}$.

Finally, after tapping a control member relative to the movement axis C, the flight path angle P of the aircraft varies by a value of 0.1% of the angle on each tap and the flight path angle P varies at a rate of 0.3% per second (%/s) when a long press is applied to the control member and for so long as the press is maintained. Thereafter, after each tap or when the pilot releases this long press on the control member relative to the movement axis C, the autopilot aligns its flight setpoint on the new flight path angle $P_n$ of the aircraft in order to follow a new track $T_{soln}$.

In addition, the rate at which the P varies may itself be variable so as to take account of a target altitude or of a target stop point of the aircraft, for example. In addition, varying the flight path angle P modifies this target altitude or this target stop point and consequently modifies the distance to the target altitude or to the target stop point. The rate of variation of the flight path angle P may for example be proportional to the inverse of the square of the forward speed of the aircraft at high forward speed.

Nevertheless, below a third threshold speed $V_{thresh3}$, the aircraft flying along a specified flight path angle P is not meaningful, and the piloting of the aircraft can be performed with respect to flight setpoints that include a setpoint for vertical speed $W_Z$. Under such circumstances, an action on a control member relative to the movement axis C modifies the vertical speed $W_Z$ of the aircraft. A long press on the control member relative to the movement axis C while the aircraft is flying at a forward speed less than the third threshold speed $V_{thresh3}$, causes the aircraft to accelerate or decelerate vertically, e.g. by 150 ft/min so long as this press is maintained. Thereafter, when the pilot releases the control member relative to the movement axis C, the autopilot generally aligns its flight setpoints on the new vertical speed $W_{Z_n}$.

In contrast, when the aircraft is flying in the second mode of operation of the control members and of the autopilot in the method of the invention, the effects of these control members can be different.

When the aircraft is flying while maintaining heading, then a long press on a control member relative to the movement axis A causes the aircraft to accelerate or decelerate longitudinally, typically by 1.5 kt/s so long as the long press is maintained. Thereafter, when the pilot releases the control member relative to the movement axis A, the autopilot aligns its flight setpoints on the new longitudinal speed $U_{X_n}$ of the aircraft.

Likewise, a long press on a control member relative to the movement axis B causes the aircraft to accelerate or decelerate laterally, typically by 1.5 kt/s so long as the long press is maintained. Thereafter, when the pilot releases the control member relative to the movement axis B, the autopilot aligns its flight setpoints on the new lateral speed $V_{Y_n}$ of the aircraft in the first or second synchronization conditions.

In addition, on a long press on a control member relative to the movement axis C, the aircraft accelerates or decelerates vertically by 150 ft/min so long as the long press is maintained. Then, when the pilot releases the control member relative to the movement axis C, the autopilot generally keeps unchanged the initial flight setpoints corresponding to the vertical speed $W_Z$, i.e. a value of zero so as to ensure that altitude is maintained.

Furthermore, a long press on a control member relative to the movement axis D causes the aircraft to turn about its yaw axis at an angular speed of 3°/s. If this long press is maintained for more than three seconds, the aircraft then turns about its yaw axis at an angular speed of 10°/s so long as the press is maintained. Thereafter, when the pilot releases the control member relative to the movement axis D, the autopilot aligns its flight setpoints on the new heading $\Psi_n$ of the aircraft.

In addition, when the aircraft is hovering, a tap on a control member relative to the movement axis A causes the aircraft to move longitudinally by 1 meter (m). Likewise, a tap on a control member relative to the movement axis B causes the aircraft to move laterally by 1 m and a tap on a control member relative to the movement axis C causes the aircraft to move vertically by 1 ft.

The flight setpoints of the autopilot, regardless of whether it is track or heading that is being maintained, are generally constant so long as the pilot does not act on a control member. Nevertheless, these flight setpoints may be variable in a particular mode of operation of the method of the invention for the purpose of causing the aircraft to engage hovering towards a determined stop position S when this particular mode of operation is engaged.

During this particular mode of operation of the method of the invention, the pilot can act on each of the control members relative to the movement axes A, B, C, D so as to modify at least one parameter of the track $T_{sol}$. Thereafter, new flight setpoints of the autopilot are aligned, which setpoints are likewise variable in order to enable the aircraft to engage hovering towards a new stop position $S_n$ that is determined from the stop position S that was determined when engaging this particular mode of operation and from the actions of the pilot on the control members.

The stop position S and the new stop position $S_n$ may be displayed on display means in order to inform the pilot.

The present invention also provides a flight control system for a rotary wing aircraft and suitable for maintaining track or else maintaining heading, the flight control system including at least one control member provided with a plurality of movement axes A, B, C, D, jointly, and an autopilot for generating control signals in predefined modes of operation and in compliance with flight setpoints.

The flight control system of the aircraft may also have a first control lever enabling the cyclic pitch of the main blades of a main rotor of the aircraft to be varied and a second control lever enabling the collective pitch of the main blades of the main rotor to be varied. The first control lever has two movement axes serving in particular to control movements in rotation of the aircraft about longitudinal and/or transverse directions X and Y. The second control lever has a single movement axis and serves in particular to control movements of the aircraft in translation along the elevation direction Z.

The flight control system can thus perform the above-described flight control method for maintaining track or for maintaining heading.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 shows an aircraft having flight control of the invention;

FIG. 2 is a diagram showing the ground course angle and the heading of the aircraft;

FIGS. 3 and 4 are two detail views of control levers of a rotary wing aircraft.

Elements shown in more than one of the figures are given the same references in each of them.

DETAILED DESCRIPTION OF THE INVENTION

In FIG. 1, there can be seen an aircraft 10 that has a main rotor 11 positioned above a fuselage 13 and an anti-torque tail rotor 12 positioned at the tail end of a tail boom 14. The aircraft 10 also has an instrument panel 5, a seat 20 on which a pilot of the aircraft 10 can sit, an autopilot 15, and manual control means made up in particular of two control levers 21 and 22, and of pedals 23.

Furthermore, an X, Y, Z reference frame is attached to the aircraft 10, and more particularly to its center of gravity. The longitudinal direction X extends from the rear of the aircraft 10 to the front of the aircraft 10, the elevation direction Z extends upwards perpendicularly to the longitudinal direction X, and the transverse direction Y extends from left to right perpendicularly to the longitudinal and elevation directions X and Y.

The longitudinal direction X is the roll axis of the aircraft 10, the transverse direction Y is its pitching axis, and the elevation direction Z is its yaw axis.

The main rotor 11 has an axis of rotation that is substantially vertical, i.e. parallel to the elevation direction Z, and it is provided with three main blades 111, 112, 113 having collective pitch and cyclic pitch that are variable under the control of the control levers 21, 22 and of the autopilot 15. In similar manner, the tail rotor 12 has its axis of rotation substantially horizontal, i.e. parallel to the transverse direction Y, and it is provided with four secondary blades 121, 122, 123, 124 of collective pitch that is variable and controllable by means of the pedals 23 and of the autopilot 15.

More precisely, the first control lever 21 is movable about the longitudinal and transverse directions X and Y and serves to control the cyclic pitch of the main blades 111, 112, 113 by means of a first control linkage 24. The second control lever 22 is movable about the transverse direction Y and controls the collective pitch of the main blades 111, 112, 113 by means of a second control linkage 25. Taking action on the first control lever 21 then serves to control movements in rotation of the aircraft 10 about the longitudinal and transverse directions X and Y, and taking action on the second control lever then serves to control movements in translation of the aircraft 10 along the elevation direction Z.

Likewise, the pedals 23 control the collective pitch of the secondary blades 121, 122, 123, 124 via a third control linkage 26. Taking action on the pedals 23 then serves to control movements in rotation of the aircraft 10 about its yaw axis.

The control linkages 24, 25, 26 serve to actuate the various blades and may for example be made up of connections that are entirely mechanical between the manual control means 21, 22, 23 and the blades. These control linkages 24, 25, 26 may also be made up of mechanical connections associated with hydraulic actuator means, or indeed electrical connections associated with such hydraulic actuator means.

The autopilot 15 also serves to control the collective and cyclic pitches of the main blades 111, 112, 113, and also the collective pitch of the secondary blades 121, 122, 123, 124 by acting respectively on the same control linkages 24, 25, 26. The autopilot 15 then serves to control movements in rotation of the aircraft 10 about the longitudinal and transverse directions X and Y and movements in translation of the aircraft 10 along the elevation direction Z, and also movements in rotation of the aircraft 10 about its yaw axis.

FIGS. 3 and 4 show in greater detail the respective grip zones of the first and second control levers 21 and 22. The grip zone of each control lever 21, 22 includes in particular a respective control member 31, 32 and a pushbutton 33. Each control member 31, 32 is movable about two specific movement axes A & B, C & D. A first control member 31 present on the first control lever 21 and shown in FIG. 3 is movable about two movement axes A and B. In similar manner, a second control member 32 present on the second control lever 22 and shown in FIG. 4 is movable about two movement axes C and D.

A flight control system 1 is made up of manual control means 21, 22, 23, of the control members 31, 32, of the pushbutton 33, of the autopilot 15, and of the control linkages 24, 25, 26.

The aircraft 10 can fly along a track $T_{sol}$ relative to the ground, this track $T_{sol}$ being determined relative to the ground and defined in a terrestrial geographical reference frame, e.g. determined by the cardinal points and the direction of terrestrial gravity.

A flight of an aircraft 10 along the track $T_{sol}$ may be characterized using two types of characterization by using different parameters for the track $T_{sol}$.

In a first type of characterization, a flight of an aircraft 10 along the track $T_{sol}$ is characterized by a ground course angle $TK_{sol}$ between the direction of the track $T_{sol}$ and the direction of north in a horizontal plane of the terrestrial geographical reference frame, a forward speed Va of the aircraft 10, a flight path angle P formed by the angle between the direction of the track $T_{sol}$ and the horizontal orientation of the terrestrial reference frame, and a heading $\Psi$ which is the angle formed between the direction of north and the projection of the longitudinal direction X of the aircraft 10 onto a horizontal plane of the terrestrial reference frame.

The forward speed Va of the aircraft 10 is the speed of the aircraft 10 along the direction of the track $T_{sol}$, and this speed may be defined relative to the ground or else relative to the air.

In a second type of characterization, a flight of an aircraft 10 along the track $T_{sol}$ is characterized by a longitudinal speed $U_X$ along the longitudinal direction X, a lateral speed $V_Y$ along the transverse direction Y, and a vertical speed $W_Z$ along the elevation direction Z, and also by the heading $\Psi$.

These longitudinal, lateral, and vertical speeds, $U_X$, $V_Y$, and $W_Z$ are respective components of the forward speed Va of the aircraft 10 along the three specified directions X, Y, Z of the aircraft 10.

FIG. 2 shows a projection onto a horizontal plane of the terrestrial reference frame of a track $T_{sol}$. The longitudinal and transverse directions X, Y of the aircraft 10 are also shown as are the directions N, W of a terrestrial geographical reference frame.

The heading $\Psi$ is thus shown between the longitudinal direction X of the aircraft 10 and the direction N of north. The course angle $TK_{sol}$ on the ground is shown between the direction of the track $T_{sol}$ and the direction N of north.

It can be seen that the heading $\Psi$ is different from the ground course angle $TK_{sol}$. Consequently, the nose and the tail boom 14 of the aircraft 10, which are in alignment on the longitudinal direction X, are not in alignment with the track $T_{sol}$. Likewise, the forward speed Va is in alignment with the track $T_{sol}$ and is not parallel to the longitudinal direction X.

In addition, the longitudinal and lateral speeds $U_X$ and $V_Y$ are respective projections of the forward speed Va of the aircraft 10, and preferably of the forward speed of the aircraft 10 relative to the ground, onto the longitudinal and transverse directions X and Y. The vertical speed $W_Z$ and also the flight path angle P are not shown in FIG. 2, which lies in a horizontal plane of the terrestrial reference frame, and thus extends perpendicularly to the elevation direction Z.

The aircraft 10 travels generally along a track $T_{sol}$ in order to reach a target on the ground, such as a landing ground. Nevertheless, the pilot may need to modify one or more parameters of the track $T_{sol}$, e.g. in order to slow down, avoid an obstacle not listed in a database of the aircraft 10, or merely in order to change route. Such modifications are necessary in particular when performing visual flight and at low altitude, and as a function of the surroundings and/or of weather conditions.

Nevertheless, depending on the flight conditions of the aircraft 10, and in particular on its longitudinal speed $U_X$, the maneuvers performed by the pilot are different. When the aircraft 10 is traveling at a low longitudinal speed $U_X$, the piloting of the aircraft 10 is generally performed by maintaining heading, with the pilot acting on the parameters of the track $T_{sol}$ in the second type of characterization. Under such circumstances, the pilot acts directly to control the longitudinal, lateral, and vertical speeds $U_X$, $V_Y$, and $W_Z$, and also the heading $\Psi$ of the aircraft 10, e.g. so as to move at very low longitudinal speeds $U_X$ and at low altitude close to buildings.

In contrast, when the aircraft 10 is traveling at a faster longitudinal speed $U_X$, the piloting of the aircraft 10 is generally performed by maintaining track, with the pilot acting on the parameters of the track $T_{sol}$ in the first type of characterization. Under such circumstances, the pilot prefers to control the forward speed Va of the aircraft 10 directly along the track $T_{sol}$ so as to slow down or accelerate the aircraft 10, and to control the ground course angle $TK_{sol}$ so as to modify said track $T_{sol}$, and also to control the flight path angle P and possibly the heading Ψ.

Nevertheless, travel of the aircraft 10 at a flight path angle P is meaningful only above a certain forward speed, which is of the order of 20 kt. When the forward speed Va of the aircraft 10 is less than a third threshold speed $V_{thresh3}$, while in the speed range for maintaining track, the pilot of the aircraft 10 controls the vertical speed $W_Z$ of the aircraft 10 instead of the flight path angle P. The flight setpoint expressed in terms of flight path angle P is replaced by a flight setpoint expressed in terms of the vertical speed $W_Z$ of the aircraft 10.

A flight control method by maintaining track or heading makes it possible to switch, as a function of the longitudinal speed $U_X$ of the aircraft 10, between a first mode of operation of the control members 31, 32 and of the autopilot 15 in the first type of characterization for the track $T_{sol}$ and a second mode of operation of the control members 31, 32 and of the autopilot 15 in the second type of characterization for the track $T_{sol}$. This second mode of operation of the control members 31, 32 and of the autopilot 15 is thus used at low forward speed Va, with the first mode of operation being used at higher forward speeds Va.

Thus, during this first mode of operation of the control members 31, 32 and of the autopilot 15, the autopilot 15 enables the aircraft 10 to fly with track being maintained relative to the ground, the flight setpoints of the autopilot 15 being the ground course angle $TK_{sol}$, the forward speed Va, the flight path angle P or else the vertical speed $W_Z$, where appropriate, and the heading Ψ. In contrast, in the second mode of operation of the control members 31, 32 and of the autopilot 15, the autopilot 15 enables the aircraft 10 to fly while maintaining heading, the flight setpoints of the autopilot 15 being the longitudinal speed $U_X$, the lateral speed $V_Y$, the vertical speed $W_Z$, and the heading Ψ.

The flight control system 1 enables this flight control method to be performed while maintaining track or while maintaining heading. This flight control method while maintaining track or maintaining heading is engaged by means of a button 33, e.g. by the pilot pressing the button 33 once only, or else by pressing it twice.

The changeover between the first and second modes of operation of the control members 31, 32 and of the autopilot 15 is performed relative to a threshold with hysteresis using two threshold speeds $V_{thresh1}$ and $V_{thresh2}$, the first threshold speed $V_{thresh1}$ being greater than the second threshold speed $V_{thresh2}$.

The first mode of operation of the control members 31, 32 and of the autopilot 15 is engaged as soon as the longitudinal speed $U_X$ exceeds the first threshold $V_{thresh1}$ and it remains engaged so long as the longitudinal speed $U_X$ is greater than or equal to the second threshold speed $V_{thresh2}$. Likewise, the second mode of operation of the control members 31, 32 and of the autopilot 15 is engaged as soon as the longitudinal speed $U_X$ becomes less than the second threshold speed $V_{thresh2}$ and it remains engaged so long as the longitudinal speed $U_X$ is less than or equal to the first threshold speed $V_{thresh1}$.

The threshold speeds $V_{thresh1}$ and $V_{thresh2}$ may be a function of the flight conditions of the aircraft 10, essentially of the speed and the wind direction and also of the lateral speed $V_Y$ aircraft 10.

In addition, during these two modes of operation of the control members 31, 32 and of the autopilot 15, piloting by transparency is possible in order to adjust the track $T_{sol}$. The pilot can thus cause one or more parameters of the track $T_{sol}$ to be modified directly by using the control members 31, 32 and by means of the autopilot 15.

In the first mode of operation of the control members 31, 32 and of the autopilot 15, this flight control method makes it possible to ensure that the track $T_{sol}$ is maintained by modifying the forward speed Va, the ground course angle $TK_{sol}$, the flight path angle P or else the vertical speed $W_Z$, where appropriate, and possibly also the heading Ψ by using the autopilot 15 acting on the various flight parameters.

Likewise, in the second mode of operation of the control members 31, 32 and of the autopilot 15, the flight control method makes it possible to ensure that heading is maintained by modifying the longitudinal speed $U_X$, the lateral speed $V_Y$, and the vertical speed $W_Z$, and the heading Ψ by means of the autopilot 15 acting on the various flight parameters.

Each action of the pilot on one of the control members 31, 32 relative to a movement axis A, B, C, or D acts via the autopilot 15 to modify one of the parameters of the track $T_{sol}$.

Thus, while maintaining track, an action of the pilot on one of the control members 31, 32 relative to a movement axis A, B, C modifies respectively the forward speed Va, the ground course angle $TK_{sol}$, or the flight path angle P or else the vertical speed $W_Z$, as appropriate. Furthermore, the ground course angle $TK_{sol}$ can also be modified by the pilot acting on one of the control members 31, 32 relative to the movement axis D. The heading Ψ can be modified by the pilot acting on the pedals 23.

In contrast, while maintaining heading, an action of the pilot on one of the control members 31, 32 relative to the movement axes A, B, C, D serves respectively to modify the longitudinal speed $U_X$, the lateral speed $V_Y$, the vertical speed $W_Z$, or the heading Ψ.

Naturally, the pilot can act simultaneously on one or two control members 31, 32 relative to a plurality of movement axes A, B, C, D in order to modify a plurality of parameters of the track $T_{sol}$.

The autopilot 15 takes account of the actions of the pilot on the control members 31, 32, modifies its flight setpoints as a function of these actions, and then generates control signals in order to modify the pitch of the main blades 111, 112, 113 of the main rotor 11 and possibly the pitch of the secondary blades 121, 122, 123, 124 of the tail rotor 12. The aircraft 10 then follows a new track $T_{soln}$, for which one or more parameters have been modified as requested by the pilot, these modified parameters being the new flight setpoints of the autopilot 15.

During each action of the pilot on one of the control members 31, 32, new flight setpoints of the autopilot 15 can be aligned with the new parameters for the track $T_{soln}$, i.e. a new ground course angle $TK_{soln}$, a new forward speed $Va_n$, a new flight path angle $P_n$ or else a new vertical speed $W_{Zn}$, as appropriate, and/or a new heading $Ψ_n$ in the first mode of operation of the control members 31, 32 and of the autopilot 15, and a new longitudinal speed $U_{Xn}$, a new lateral speed $V_{Yn}$, a new vertical speed $W_{Zn}$, and/or a new heading $Ψ_n$ in the second mode of operation of the control members 31, 32 and of the autopilot 15.

Nevertheless, in the context of maintaining heading, synchronization conditions may be taken into account in order to align these new flight setpoints as to avoid flight situations that are potentially dangerous for the aircraft 10 which is generally flying at low altitudes and close to buildings or to terrain.

According to first synchronization conditions, these flight setpoints are aligned respectively and independently on the new longitudinal and lateral speeds $U_{X_n}$ and $V_{Y_n}$ if the new longitudinal speed $U_{X_n}$ is greater than a fourth threshold speed $V_{thresh4}$ and if the new lateral speed $V_{Y_n}$ has an absolute value less than a fifth threshold speed $V_{thresh5}$.

According to second synchronization conditions, these flight setpoints are aligned respectively and independently on the new longitudinal speed $U_{X_n}$ if this new longitudinal speed $U_{X_n}$ is greater than a fourth threshold speed $V_{thresh4}$ and on the new lateral speed $V_{Y_n}$ after a specific action of a pilot of the aircraft 10. By way of example, this action of the pilot is pressing on a button for synchronizing the new lateral speed $V_{Y_n}$ of the aircraft 10. According to these second synchronization conditions, the pilot decides whether the new lateral speed $V_{Y_n}$ is to be one of the flight setpoints.

In contrast, regardless of synchronization conditions, if the new longitudinal speed $U_{X_n}$ is less than a fourth threshold speed $V_{thresh4}$, the flight setpoint corresponding to the longitudinal speed $U_X$ is aligned on the fourth threshold speed $V_{thresh4}$.

Likewise, if the new lateral speed $V_{Y_n}$ has an absolute value greater than the fifth threshold speed $V_{thresh5}$, the flight setpoint corresponding to the lateral speed $V_Y$ is aligned on this fifth threshold speed $V_{thresh5}$.

The flight setpoint corresponding to the vertical speed $W_Z$ of the aircraft 10 is generally zero when flying while maintaining heading. Such flight generally takes place at low altitude and the aircraft 10 travels in such surroundings in automatic flight at an altitude that is constant relative to the ground, i.e. with a vertical speed $W_Z$ that is zero. After the pilot has taken an action to generate a modification to this vertical speed $W_Z$, the flight setpoint corresponding to the vertical speed $W_Z$ generally remains unchanged and thus zero.

Nevertheless, if this action of the pilot causes the aircraft 10 to travel at a new vertical speed $W_{Z_n}$ that is large and greater than a sixth threshold speed $V_{thresh6}$, and if the pilot does not reduce this new vertical speed $W_{Z_n}$, it can be deduced that the pilot now seeks to travel with this new vertical speed $W_{Z_n}$. Under such circumstances, these flight setpoints may be aligned on the new vertical speed $W_{Z_n}$, which is greater than the sixth threshold speed $V_{thresh6}$.

In contrast, when the new vertical speed $W_{Z_n}$ of the aircraft is negative, the flight setpoint corresponding to this vertical speed $W_Z$ may remain zero in order specifically to avoid a flight situation that is dangerous for the aircraft 10, or else it may be aligned on the new vertical speed $W_{Z_n}$ when the new vertical speed $W_{Z_n}$ lies within the following range of negative vertical speeds $W_Z$: 0 ft/min to −500 ft/min.

Furthermore, if an absolute value of the new longitudinal speed $U_{X_n}$ and/or of the new lateral speed $V_{Y_n}$ is small and less than a seventh threshold speed $V_{thresh7}$, the pilot seeks to maintain this new speed as zero and the corresponding flight setpoint needs to be zero.

In contrast, the flight setpoints of the autopilot continue to be aligned on the new heading $\Psi_n$.

In addition, the first control lever 21 may be used as the first control member 31 and the second control lever 22 is used as the second control member 32.

Nevertheless, such particular utilization of the control levers 21 and 22 is not suitable for performing urgently a sudden maneuver of the aircraft 10, e.g. for the purpose of avoiding an obstacle to be found on the track $T_{sol}$ or indeed close thereto. The first and second control levers 21, 22 then do not enable a vertical lateral movement of the aircraft 10 to be performed quickly.

Maintaining the setpoint for the flight path angle P or for the vertical speed $W_Z$, as appropriate, by means of the autopilot 15 is deactivated as soon as it is detected that the pilot is acting violently on the first control lever 21. Consequently, the pilot can control the longitudinal cyclic pitch so as to make the aircraft 10 move in rotation about the pitching axis, and the pilot may possibly act on the collective pitch in order to cause the aircraft 10 to move in translation along the elevation direction Z and thus perform the necessary avoidance maneuver.

Regardless of whether track or heading is being maintained, the flight setpoints of the autopilot 15 are generally constant so long as the pilot does not act on a control member 31, 32. Nevertheless, these flight setpoints may be variable in the context of a particular mode of operation of the method for maintaining track or heading for the purpose of causing the aircraft 10 to hover at a determined stop position S on engaging this particular mode of operation.

During this particular mode of operation, the pilot can act on each of the control members 31, 32 relative to the movement axes A, B, C, D so as to modify at least one parameter for the track $T_{sol}$. Consequently, new flight setpoints of the autopilot are aligned, which new flight setpoints are also variable so as to enable the aircraft 10 to be caused to hover over a new stop position $S_n$ determined from the stop position S as determined when applying this particular mode of operation and from the actions of the pilot on the control members 31, 32.

Naturally, the present invention may be subjected to numerous variations as to its implementation. Although several embodiments are described, it will readily be understood that it is not conceivable to identify exhaustively all possible implementations. It is naturally possible to envisage replacing any of the means described by equivalent means without going beyond the ambit of the present invention.

In particular, the aircraft 10 with this flight control system 1 is not limited to the aircraft 10 shown in FIG. 1. By way of example, the aircraft 10 may have two main rotors or it may be a hybrid helicopter.

Furthermore, the number of main blades 111, 112, 113 of a main rotor 11, and the number of secondary blades 121, 122, 123, 124 of a tail rotor 12 are not limited to the example aircraft 10 shown in FIG. 1. A main rotor 11 or a tail rotor 12 may have two, three, four, five, or even more than five blades.

What is claimed is:

1. A flight control method for a rotary wing aircraft, the aircraft following a track $T_{sol}$ relative to the ground with a forward speed Va, a longitudinal direction X extending from the rear of the aircraft to the front of the aircraft, an elevation direction Z extending upwards perpendicularly to the longitudinal direction X, and a transverse direction Y extending from left to right perpendicularly to the longitudinal and elevation directions X and Z, the aircraft comprising:

at least one rotary wing having a plurality of main blades of collective pitch and cyclic pitch that are variable about respective pitch axes, the aircraft being capable of performing movements in rotation about the directions X, Y, Z and of performing movements in translation along the directions X, Y, Z;

an autopilot that generates control signals in predefined modes of operations and in application of flight setpoints, the control signals being capable of causing the aircraft to perform the movements in rotation and/or in translation relative to the directions X, Y, Z; and flight controls having at least one control member provided jointly with a plurality of movement axes A, B, C, D;

the method comprising the following steps:

applying a first mode of operation of the control members and of the autopilot when the longitudinal speed $U_X$ of the aircraft is greater than a first threshold speed $V_{thresh1}$, the longitudinal speed $U_X$ being a projection of the forward speed Va onto the longitudinal direction X, the autopilot then enabling the aircraft to fly while maintaining track relative to the ground, the flight setpoints of the autopilot being a ground course angle $TK_{sol}$, the forward speed Va, a flight path angle P, and a heading $\Psi$; and applying a second mode of operation for the control members and the autopilot when the longitudinal speed $U_X$ is less than a second threshold speed $V_{thresh2}$, the first threshold speed $V_{thresh1}$ being greater than the second threshold speed $V_{thresh2}$, the autopilot then enabling the aircraft to fly while maintaining heading, the flight setpoints of the autopilot being the longitudinal speed $U_X$, a lateral speed $V_Y$, a vertical speed $W_Z$, and the heading $\Psi$.

2. A flight control method according to claim 1 for a rotary wing aircraft, wherein:

the first mode of operation of the control members and of the autopilot remains engaged so long as the longitudinal speed $U_X$ is greater than or equal to the second threshold speed $V_{thresh2}$; and the second mode of operation of the control members and of the autopilot remains engaged so long as the longitudinal speed $U_X$ is less than or equal to the first threshold speed $V_{thresh1}$.

3. A flight control method according to claim 1 for a rotary wing aircraft, wherein during the first mode of operation of the control members and of the autopilot:

in order to enable the aircraft to follow a new track $T_{soln}$, it is possible by transparency to modify:

the forward speed Va by a first action relative to a first movement axis A of a control member and by means of the autopilot;

the ground course angle $TK_{sol}$ by a second action relative to a second movement axis B of a control member and by means of the autopilot; and/or the flight path angle P by a third action relative to a third movement axis C of a control member and by means of the autopilot; and the flight setpoints of the autopilot are aligned on the parameters of the new track $T_{soln}$, the flight setpoints being a new ground course angle $TK_{sol}$, a new forward speed $Va_n$, a new flight path angle $P_n$, and/or a new heading $\Psi$ in order to enable the autopilot to follow the new track $T_{soln}$.

4. A flight control method according to claim 3 for a rotary wing aircraft, wherein during the first mode of operation of the control members and of the autopilot:

in order to cause the aircraft to follow a new track $T_{soln}$, it is possible by transparency to modify the ground course angle $TK_{sol}$ relative to the ground by a fourth action relative to a fourth movement axis D of a control member and by means of the autopilot; and the flight setpoints of the autopilot are aligned on the new parameters of the new track $T_{soln}$ on a new ground course angle $TK_{soln}$ in order to enable the autopilot to follow the new track $T_{soln}$.

5. A flight control method according to claim 1 for a rotary wing aircraft, wherein if the forward speed Va is less than a third threshold speed $V_{thresh3}$, the flight path angle P is replaced by the vertical speed $W_Z$ as the flight setpoint of the autopilot in the first mode of operation of the control members and of the autopilot.

6. A flight control method according to claim 1 for a rotary wing aircraft, wherein the second mode of operation of the control members and of the autopilot:

in order to enable the aircraft to follow a new track $T_{soln}$, it is possible by transparency and independently to modify:

the longitudinal speed $U_X$ by a first action relative to a first movement axis A of a control member and by means of the autopilot;

the lateral speed $V_Y$ by a first action relative to a second movement axis B of a control member and by means of the autopilot; and/or the vertical speed $W_Z$ by a third action relative to a third movement axis C of a control member and by means of the autopilot; and the flight setpoints of the autopilot are aligned on:

a new longitudinal speed $U_{Xn}$ of the aircraft if the new longitudinal speed $U_{Xn}$ is greater than a fourth threshold speed $V_{thresh4}$; and a new lateral speed $V_{Yn}$ of the aircraft if the new lateral speed $V_{Yn}$ has an absolute value that is less than a fifth threshold speed $V_{thresh5}$.

7. A flight control method according to claim 1 for a rotary wing aircraft, wherein in the second mode of operation of the control members and of the autopilot:

in order to enable the aircraft to follow a new track $T_{soln}$, it is possible by transparency and independently to modify:

the longitudinal speed $U_X$ by a first action relative to a first movement axis A of a control member and by means of the autopilot;

the lateral speed $V_Y$ by a second action relative to a second movement axis B of a control member and by means of the autopilot; and/or the vertical speed $W_Z$ by a third action relative to a third movement axis C of a control member and by means of the autopilot; and the flight setpoints of the autopilot are aligned on:

a new longitudinal speed $U_{Xn}$ of the aircraft if the new longitudinal speed $U_{Xn}$ is greater than a fourth threshold speed $V_{thresh4}$; and a new lateral speed $V_{Yn}$ of the aircraft after the pilot of the aircraft performs a specific action.

8. A flight control method according to claim 6 for a rotary wing aircraft, wherein in the second mode of operation of the control members and of the autopilot, the flight setpoints of the autopilot are aligned on a new vertical speed $W_{Zn}$ of the aircraft if the new vertical speed $W_{Zn}$ has an absolute value that is greater than a sixth threshold speed $V_{thresh6}$.

9. A flight control method according to claim 6 for a rotary wing aircraft, wherein in the second mode of operation of the control members and of the autopilot:

it is possible by transparency to modify the heading $\Psi$ by a fourth action relative to a fourth movement axis D of a control member and by means of the autopilot, independently of the speed $U_X$, $V_Y$, $W_Z$; and the flight setpoint of the autopilot corresponding to the heading $\Psi$ of the aircraft is aligned on a new heading $\Psi_n$.

10. A flight control method according to claim 6, for a rotary wing aircraft, wherein:

if the new longitudinal speed $U_{X_n}$ has an absolute value that is less than a seventh threshold speed $V_{thresh7}$, the flight setpoint corresponding to the longitudinal speed $U_X$ is zero; and if the new lateral speed $V_{Y_n}$ has an absolute value that is less than the seventh threshold speed $V_{thresh7}$, the flight setpoint corresponding to the lateral speed $U_Y$ is zero.

11. A flight control method according to claim 1 for a rotary wing aircraft, wherein the first and second threshold speeds $V_{thresh1}$, $V_{thresh2}$ are a function of the longitudinal speed of the relative wind to which the aircraft is subjected and of the lateral speed $V_Y$.

12. A flight control method according to claim 1 for a rotary wing aircraft, wherein the aircraft has firstly a first control lever for controlling movements in rotation of the aircraft about the longitudinal and transverse directions X and Y, and secondly a second control lever for controlling movements of the aircraft in translation along the elevation direction Z, and a first control member is the first control lever, and a second control member is the second control lever, the first control member having the first movement axis A and the second movement axis B, the second control member having the third movement axis C.

13. A flight control method according to claim 12 for a rotary wing aircraft, wherein a violent action on the first control lever causes the autopilot to deactivate maintaining the flight path angle setpoint P, the first control lever then controlling movements in rotation of the aircraft about the longitudinal direction X, and the second control lever controlling movements in translation of the aircraft along the elevation direction Z.

14. A flight control method according to claim 1 for a rotary wing aircraft, wherein the aircraft has firstly a first control lever for controlling movements in rotation of the aircraft about the longitudinal and transverse directions X and Y, and secondly a second control lever enabling movements of the aircraft in translation to be controlled along the elevation direction Z, and a first control member is positioned on the first control lever and a second control member is positioned on the second control lever, the first control member having the first movement axis A and the second movement axis B, and the second control member having the third movement axis C.

15. A flight control method according to claim 14 for a rotary wing aircraft, wherein the second control member has a fourth movement axis D.

16. A flight control method according to claim 1 for a rotary wing aircraft, wherein the control members are calibrated and control precise movements of the aircraft.

17. A flight control method according to claim 1 for a rotary wing aircraft, wherein the flight setpoints of the autopilot can be varied in order to cause the aircraft to engage hovering flight towards a stop position S that is determined on applying the engagement of hovering flight for the aircraft.

18. A flight control system for a rotary wing aircraft, the aircraft following a track $T_{sol}$ relative to the ground with a forward speed Va, a longitudinal direction X extending from the rear of the aircraft to the front of the aircraft, an elevation direction Z extending upwards perpendicularly to the longitudinal direction X, and a transverse direction Y extending from left to right perpendicularly to the longitudinal and elevation directions X and Z:

the aircraft comprising at least one rotary wing having a plurality of main blades of collective pitch and cyclic pitch that are variable about respective pitch axes, the aircraft being capable of performing movements in rotation about the directions X, Y, Z and of performing movements in translation along the directions X, Y, Z;

the flight control system comprising:

at least one control member provided jointly with a plurality of movement axes A, B, C, D; and an autopilot that generates control signals in predefined modes of operation and in application of flight setpoints, the control signals being capable of causing the aircraft to perform the movements in rotation and/or in translation relative to the directions X, Y, Z; and wherein the flight control system performs the flight control method according to claim 1 for a rotary wing aircraft.

* * * * *